(12) United States Patent
Boone, Jr. et al.

(10) Patent No.: US 8,082,658 B2
(45) Date of Patent: Dec. 27, 2011

(54) CONTROLLED LAPPING FOR AN ABS DAMASCENE PROCESS

(75) Inventors: Thomas D. Boone, Jr., San Jose, CA (US); Glenn P. Gee, San Jose, CA (US); Paul A. Goddu, San Jose, CA (US); John P. Herber, Morgan Hill, CA (US); Hicham M. Sougrati, Burlingame, CA (US); Huey-Ming Tzeng, San Jose, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 718 days.

(21) Appl. No.: 12/036,478

(22) Filed: Feb. 25, 2008

(65) Prior Publication Data

US 2009/0211081 A1    Aug. 27, 2009

(51) Int. Cl.
*H04R 31/00* (2006.01)
(52) U.S. Cl. .......... 29/603.09; 29/603.07; 29/603.1; 29/603.12; 29/603.15
(58) Field of Classification Search ........... 29/603.07, 29/603.09, 603.1, 603.12, 603.15, 603.16
See application file for complete search history.

(56) References Cited

U.S. PATENT DOCUMENTS

| | | | |
|---|---|---|---|
| 5,588,199 A | 12/1996 | Krounbi et al. | |
| 5,850,326 A | 12/1998 | Takano et al. | |
| 6,193,584 B1 * | 2/2001 | Rudy et al. | 451/5 |
| 6,510,030 B1 | 1/2003 | Song et al. | |
| 6,665,152 B2 | 12/2003 | Nemoto | |
| 6,912,769 B2 | 7/2005 | Yoda et al. | |
| 7,253,991 B2 | 8/2007 | Fontana, Jr. et al. | |
| 7,271,982 B2 * | 9/2007 | MacDonald et al. | 360/125.02 |
| 2005/0111138 A1 | 5/2005 | Yamakawa et al. | |
| 2005/0180048 A1 | 8/2005 | MacDonald et al. | |
| 2006/0028770 A1 | 2/2006 | Etoh et al. | |
| 2006/0168798 A1 | 8/2006 | Naka | |
| 2007/0159719 A1 | 7/2007 | Yamakawa et al. | |

FOREIGN PATENT DOCUMENTS

| | | |
|---|---|---|
| JP | 57133517 | 8/1982 |
| JP | 60205811 | 10/1985 |
| JP | 62154319 | 7/1987 |
| JP | 1037703 | 2/1989 |
| JP | 1048217 | 2/1989 |
| JP | 6318311 | 11/1994 |

OTHER PUBLICATIONS

Western, DR, "Lapping Guide Extension", IBM Technical Disclosure Bulletin, p. 6347 (May 1983).

* cited by examiner

*Primary Examiner* — Derris Banks
*Assistant Examiner* — Azm Parvez
(74) *Attorney, Agent, or Firm* — Duft Bornsen & Fishman, LLP (57) ABSTRACT

Methods of lapping rows of recording heads are described after an air bearing surface (ABS) damascene process is performed. The ABS damascene process uses a selective etching process to form voids in the row of recording heads where conductive material forms a feature in the recording head, such as a wrap around shield. The conductive material is then deposited on the ABS of the row to fill the voids, and the row is lapped. According to methods provided herein, the resistance of one or more lapping guides in the row of recording heads is monitored to determine when the conductive material is removed by the lapping process. When the monitored resistance indicates that the conductive material is removed, the lapping process is stopped. The resistance across one or more lapping guides may also be used to control the lapping process to uniformly lap the conductive material from the ABS.

13 Claims, 6 Drawing Sheets

CONTROLLED LAPPING FOR AN ABS DAMASCENE PROCESS

BACKGROUND OF THE INVENTION

1. Field of the Invention

The invention is related to the field of magnetic disk drive systems and, in particular, to accurately controlling the lapping of an air bearing surface of a row of recording heads where an ABS damascene process was used to define a feature in the recording head, such as a wrap around shield.

2. Statement of the Problem

Many computer systems use magnetic disk drives for mass storage of information. Magnetic disk drives typically include one or more magnetic recording heads (sometimes referred to as sliders) that include read elements and write elements. An actuator/suspension and holds the recording head above a magnetic disk. When the magnetic disk rotates, an air flow generated by the rotation of the magnetic disk causes an air bearing surface (ABS) side of the recording head to fly a particular height above the magnetic disk. The height depends on the shape of the ABS. As the recording head rides on the air bearing, an actuator moves the actuator/suspension arm to position the read element and the write element over selected tracks of the magnetic disk.

The read element of a recording head typically includes a pair of shields with a magnetoresistance (MR) sensor formed between the shields. The MR sensor may be a Giant MR sensor, a Tunneling MR sensor, or another type of sensor. When a read operation is performed with the read element, the recording head is positioned over a selected track of the magnetic disk. Bit transitions in the track of the magnetic disk emit magnetic fields. When the MR sensor passes over a transition, the magnetic fields change the resistance of the MR sensor. The resistance of the MR sensor is measured by passing a sense current through the MR sensor, and measuring a resultant voltage across the MR sensor. The voltage measured across the MR sensor is used to generate a read signal which represents the bits written on the magnetic disk.

The write element of a recording head typically includes a pair of poles that are separated at the ABS by a write gap. The poles are connected to one another at a distal end from the ABS by a back gap. The write element also includes a coil that is wrapped about the poles and/or the back gap. When an electrical current is passed through the coil, a magnetic field is induced across the write gap which is used to write the bit transitions to the magnetic disk.

Magnetic disk drives have typically been longitudinal magnetic recording systems, wherein magnetic data is recorded as magnetic transitions formed longitudinally on a disk surface. The surface of the disk is magnetized in a direction along a track of data and then switched to the opposite direction, both directions being parallel with the surface of the disk and parallel with the direction of the data track.

Unfortunately, data density requirements are fast approaching the physical limits. Overall data density (or areal density) may be improved by improving linear density and/or track density. To improve linear density, bit sizes on a track need to be reduced which in turn requires decreasing the grain size of the magnetic medium. As this grain size shrinks, the magnetic field required to write a bit of data increases proportionally. The ability to produce a magnetic field strong enough to write a bit of data using conventional longitudinal write element technologies is reaching its physical limit.

One way to achieve higher density recordings is with perpendicular recording. In perpendicular recording systems, bits of data are recorded magnetically perpendicular to the plane of the surface of the disk. The magnetic disk may have a relatively high coercivity material at its surface and a relatively low coercivity material just beneath the surface. A write pole having a small cross section and very high magnetic flux emits a strong, concentrated magnetic field perpendicular to the surface of the disk. This magnetic field emitted from the write pole is sufficiently strong to overcome the high coercivity of the surface material and magnetize it in a direction perpendicular to its surface. The magnetic flux then flows through the magnetically soft underlayer (SUL) and returns to the surface of the disk at a location adjacent to a return pole of the write element. The return pole of the write element typically has a cross section that is much larger than that of the write pole so that the magnetic flux through the disk at the location of the return pole (as well as the resulting magnetic field between the disk and return pole) is sufficiently spread out to render the magnetic flux too weak to overcome the coercivity of the disk surface material. In this way, the magnetization imparted by the write pole is not erased by the return pole.

In perpendicular recording, the width of the write pole defines the track width on the magnetic disk, so the write pole is typically fabricated with a small pole tip in order to reduce the track widths as low as possible. As linear densities increase, wrap around shields may be formed proximate to the pole tip. The wrap around shield improves write field gradient and the angle of the field for improved writing. The sides of the wrap around shield suppress side writing. The back edge (i.e., the edge opposite the ABS) of the wrap around shield defines the throat height of the shield. The throat height should be of comparable dimensions with the gap width and the track width.

As write elements are fabricated smaller for higher density recording, smaller throat heights need to be achieved, such as less than 100 nanometers. A common method of fabricating a wrap around shield uses photolithographic processes to define the back edge of the wrap around shield. Unfortunately, present photolithographic processes have tolerances only down to about 30 nanometers. Thus, if the back edge of a wrap around shield needed to be defined at 60 nanometers, then the photolithographic processes may be off by as much as 50% in defining that back edge.

To solve this problem, an ABS damascene process may be used to define the wrap around shield instead of photolithographic processes. A further description of an ABS damascene process is provided in U.S. Patent Application Publication 2005/0180048. For an ABS damascene process, a sacrificial layer is fabricated with the photolithographic processes in place of the wrap around shield. The sacrificial layer may be Si, $SiO_2$, Ta, W, etc. The size and back edge definition of the sacrificial layer do not have to be exactly defined with the photolithographic processes as would a wrap around shield. The sacrificial layer may be much larger than an actual wrap around shield, and the back edge may be define defined much further from the ABS than the actual throat height.

When the wafer level fabrication is complete, the wafer is parted into rows of recording heads. A row of recording heads is then lapped to define an ABS or close to defining the ABS. The lapping process also defines the stripe height of the MR sensors in the recording heads. The depth to which the row is initially lapped is controlled based on resistance measurements of lapping guides that are formed in the row. The lapping guides may be the MR sensors formed in the recording heads, or Electrical Lapping Guides (ELG) that are specially fabricated in the row for the purpose of controlling the lapping process.

After lapping is completed, the sacrificial layer in each recording head is selectively etched to define a void in each recording head where a wrap around shield will be formed. The sacrificial layer is etched to a depth which defines a back edge of a wrap around shield. The selective etching process has tight tolerances to define the back edge within about 5% of the target. With the voids formed in the recording heads, wrap around shield material is deposited on the ABS of the row of recording heads. The wrap around shield material fills the voids in the recording heads, which forms the wrap around shields having well-defined back edges.

Besides just filling the voids in the recording heads, the wrap around shield material covers the entire ABS of the row of recording heads. This wrap around shield material needs to be removed in a subsequent step. One problem with the ABS damascene process described is how to remove the wrap around shield material from the ABS of the row. The wrap around shield may be removed with an additional lapping process, but there is presently no effective way of determining when to stop the additional lapping process. If the row is lapped too long to remove the wrap around shield material, then the stripe heights of the MR sensors in the recording heads may be decreased beyond a desired level. At the same time, if the row is not lapped long enough, then the wrap around shield material will remain on the ABS of the row.

Another problem is that the wrap around shield material may be lapped unevenly from the ABS of the row. When lapping is performed on the row, the resistances of the lapping guides may be monitored to determine how evenly the row is being lapped. If the row is being lapped unevenly, then the lapping process is adjusts accordingly. However, when the wrap around shield material is deposited on the ABS of the row, the wrap around shield material shorts out each of the lapping guides. Thus, the lapping guides are not able to provide the traditional resistance values that can be used to control the lapping process.

SUMMARY

Embodiments of the invention solve the above and other related problems by monitoring the resistance of one or more of the lapping guides in the row of recording heads to determine when conductive material (i.e., wrap around shield material) has been removed, and stopping the lapping process accordingly. The conductive material, which is deposited on the ABS of the row, creates a short on each of the lapping guides at the ABS. When the conductive material is removed from the lapping guides, the resistance of the lapping guides will spike from a very low resistance to a much higher resistance. Monitoring the resistance of the lapping guides allows for an accurate determination of when the conductive material has been removed from the ABS of the row so that the row is not lapped too long. This prevents the stripe height of the MR sensors from being decreased beyond a desired height by the lapping process.

The above problems are further solved by monitoring the resistance across one or more lapping guides to control the lapping process. The resistance across one or more lapping guides is influenced by the sheet resistance of the conductive material across the lapping guide(s). Sheet resistance of the conductive material is a function of the thickness of the material, and the resistance will change as the conductive material is removed during the lapping process. Thus, resistance values across the lapping guide(s) may indicate how much conductive material has been removed, and may be used to control the lapping process.

One embodiment of the invention comprises a method of controlling a lapping process for lapping a row of recording heads wherein an ABS damascene process has been performed to form a feature (i.e., a wrap around shield) in the recording heads. The method includes connecting leads to one or more lapping guides on a row of recording heads. The method further includes performing a lapping process on the row of recording heads. The surface being lapped is comprised of conductive material that has been deposited on an air bearing surface (ABS) of the row of recording heads during the ABS damascene process. The method further comprises measuring a resistance of the lapping guide(s) in the row of recording heads, and stopping the lapping process responsive to a measured resistance of the lapping guide(s) indicating that the conductive material has been removed from the ABS of the row.

Another embodiment includes another method of controlling the lapping process for lapping conductive material from a row of recording heads. The method comprises connecting a first lead and a second lead across one or more lapping guides on the row of recording heads. The method further comprises performing a lapping process on the row of recording heads to remove the conductive material. The method further comprises measuring a resistance across the lapping guide(s), and adjusting the lapping process based on the measured resistance to uniformly remove the conductive material from the ABS of the row of recording heads.

The invention may include other exemplary embodiments described below.

DESCRIPTION OF THE DRAWINGS

The same reference number represents the same element or same type of element on all drawings.

DETAILED DESCRIPTION OF THE INVENTION

FIGS. 1-6 illustrate an ABS damascene process used to form wrap around shields for write elements. Those skilled in the art will appreciate that recording heads are typically formed through wafer fabrication. Wafer fabrication is a procedure comprised of many repeated sequential processes of depositing materials, and removing portions of the materials to produce recording heads. After the layers of the recording heads are formed, the wafer is parted into rows of recording heads. Each row is then lapped to define an air bearing surfaces (ABS) for the recording heads. The surface of the row being lapped is referred to herein as the lapping surface of the row.

Figure 1:
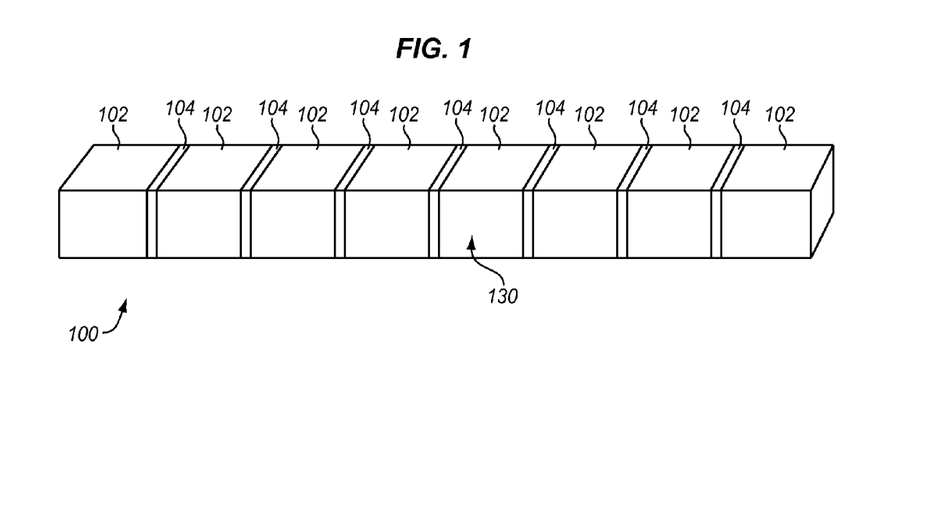
FIG. 1 is an isometric view of a row of recording heads that has been parted from a wafer.

FIG. 1 is an isometric view of a row 100 of recording heads that has been parted from a wafer. Row 100 includes a plurality of recording heads 102 that are connected by kerfs regions 104. Although only eight recording heads 102 are shown for row 100, those skilled in the art will appreciate that an actual row may include 50, 60, or more recording heads. Row 100 has a lapping surface 130, which is the surface which will be lapped in subsequent row-level fabrication processes.

Figure 2:
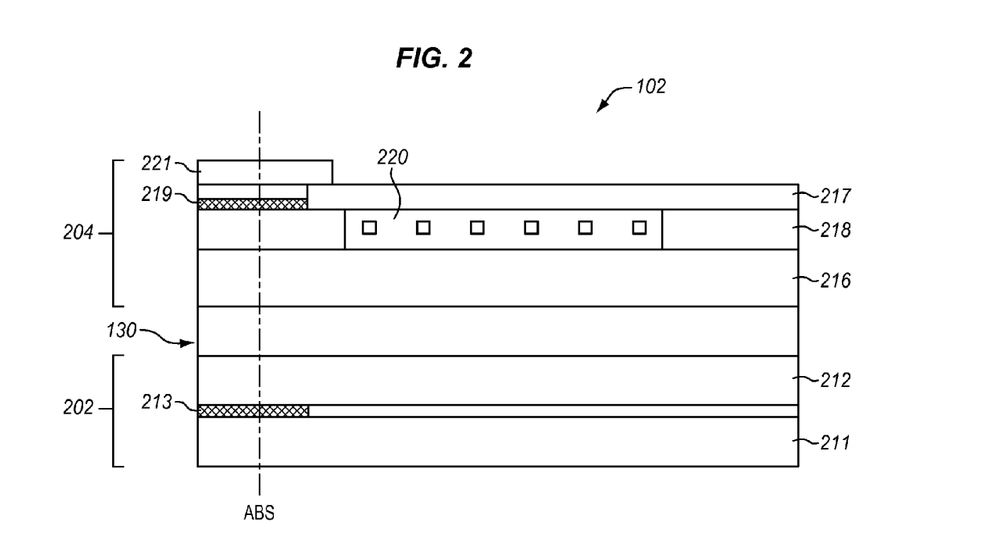
FIG. 2 is a cross-sectional view of a recording head in a row.

FIG. 2 is a cross-sectional view of a recording head 102 in row 100. Recording head 102 includes a read element 202 and a write element 204. Read element 202 includes a first shield 211 and a second shield 212 with a magnetoresistance (MR) sensor 213 formed between the shields 211-212. The MR sensor 213 may be a Giant MR sensor, a Tunneling MR sensor, or another type of sensor.

Write element 204 includes a first pole (return pole) 216, a second pole (write pole) 217 with back gap material 218 connecting poles 216-217 at a distal end from the future ABS of recording head 102. Write pole 217 further includes pole tip 219 that is proximate to the future ABS. The distance between pole tip 219 and return pole 216 is referred to as the write gap. Write element 204 further includes a coil 220 that is wrapped around back gap 218 and/or write pole 217.

For the ABS damascene process, a sacrificial layer 221 is formed above pole tip 219 instead of an actual wrap around shield. Sacrificial layer 221 may be formed from Si, $SiO_2$, Ta, W, or some other material that can be selectively etched. Sacrificial layer 221 is fabricated with photolithographic processes, but the size and back edge definition of sacrificial layer 221 do not have to be exactly defined with the photolithographic processes, as would a wrap around shield. Sacrificial layer 221 may be formed much larger than an actual wrap around shield.

As part of row-level fabrication, recording head 102 (and other recording heads in row 100) is lapped from the lapping surface 130 to the future ABS, or close to the future ABS. The initial lapping of row 100 defines the ABS of recording heads 102, and also defines the stripe heights of MR sensors 213. The stripe height of an MR sensor 213 is the distance between the ABS end of the MR sensor 213 and the other end that is distal from the ABS. The stripe height defines the resistance of the MAR sensor 213.

Figure 3:
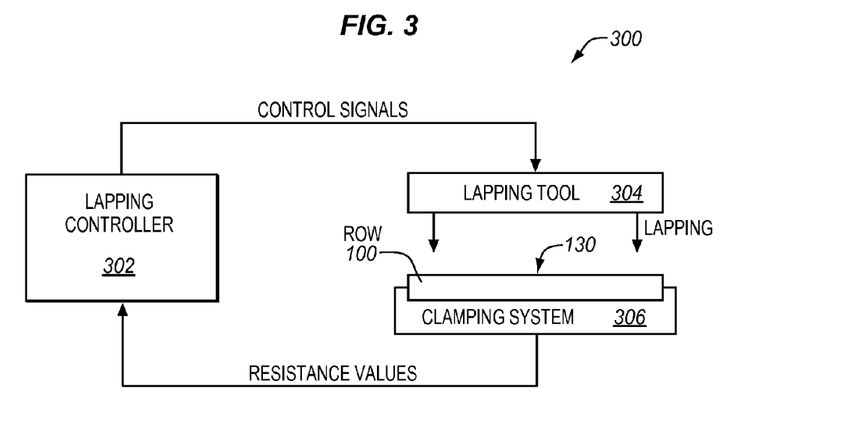
FIG. 3 is a block diagram illustrating the components of a lapping system.

FIG. 3 is a block diagram illustrating the components of a lapping system 300. Lapping system 300 includes a lapping controller 302, a lapping tool 304, and a clamping system 306. Row 100 is clamped into clamping system 306 with the lapping surface 130 facing towards lapping tool 304. Lapping tool 304 includes a plurality of pads that are connected to servo motors. Lapping controller 302 provides control signals to the servo motors in lapping tool 304 so that the pads contact lapping surface 130 and lap row 100 to a desired depth.

Lapping guides in row 100 are used to determine when a desired lapping depth has been reached. Lapping guides comprise any structures formed in row 100 proximate to the future ABS that show a resistance change as row 100 is lapped. For example, lapping guides may be the MR sensors 213 (see FIG. 2) as formed in the recording heads 102. As row 100 is lapped, the heights of the MR sensors 213 are decreased, which increases the resistance of the MR sensors 213. Thus, when the resistances of the MR sensors 213 reach a certain level, the desired ABS depth has been reached. In another example, electrical lapping guides (ELG) may be formed in recording heads 102 and/or in the kerfs regions 104 between the recording heads 102 (see FIG. 1). As with the MR sensors 213, when the resistances of the ELGs reach a certain level, the desired ABS depth has been reached.

Lapping controller 302 connects to the lapping guides through electrical leads to receive resistance values of the lapping guides. The electrical leads may comprise a ribbon cable or another type of cabling. Lapping controller 302 processes the resistance values received from the lapping guides to determine when to stop the lapping process (i.e., the desired lapping depth has been reached). Lapping controller 302 also processes the resistance values to uniformly lap the surface of row 100. For instance, if lapping guides on one end of row 100 have higher resistance values than the lapping guides on the other end of row 100, then lapping controller 302 may adjust the servo motors accordingly so that lapping tool 304 laps the surface 130 of row 100 uniformly.

Figure 4:
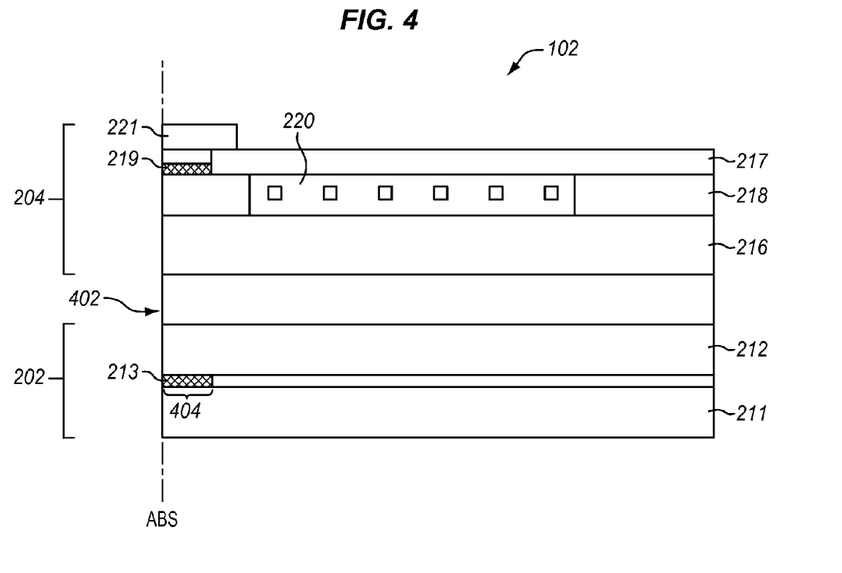
FIG. 4 is a cross-sectional view of a recording head after lapping.

FIG. 4 is a cross-sectional view of recording head 102 after lapping. The lapping process defines ABS 402 of recording head 102. Those skilled in the art will appreciate that additional lapping may be performed to more accurately define ABS 402, but the initial lapping process closely defines ABS 402. The lapping process also defines the stripe height 404 of MR sensor 213 and the flare point of pole tip 219.

Figure 5:
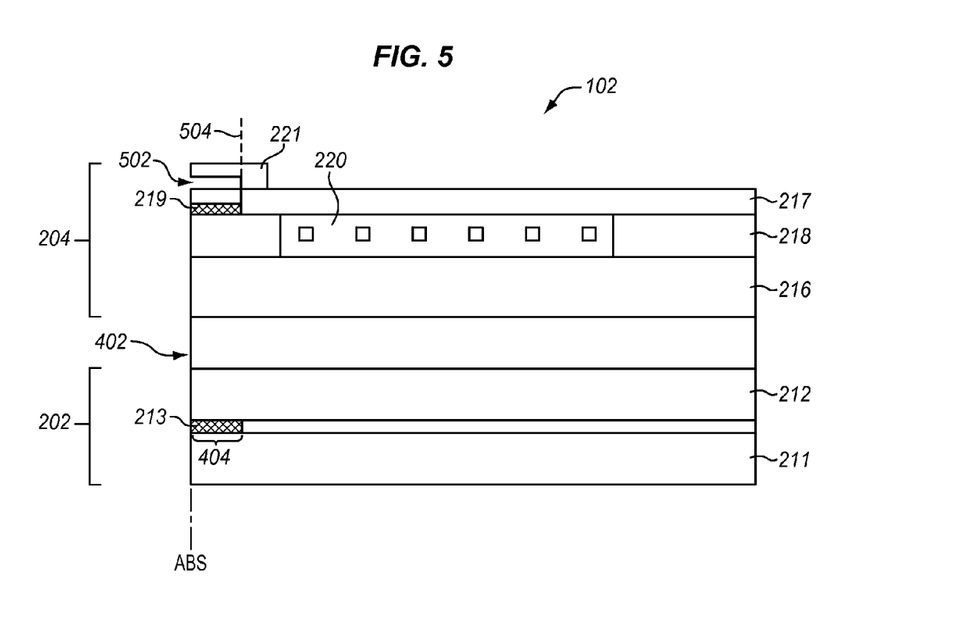
FIG. 5 is a cross-sectional view of a recording head after a selective etching process.

At this point in the ABS damascene process, a selective etching process is performed to create a void in sacrificial layer 221 of each of the recording heads 102. FIG. 5 is a cross-sectional view of recording head 102 after the selective etching process. This process creates void 502 in sacrificial layer 221 where a wrap around shield will be formed. Sacrificial layer 221 is etched to a depth which defines a back edge 504 of a wrap around shield. The selective etching process has tight tolerances to define back edge 504 within about 5 nanometers of the target.

Figure 6:
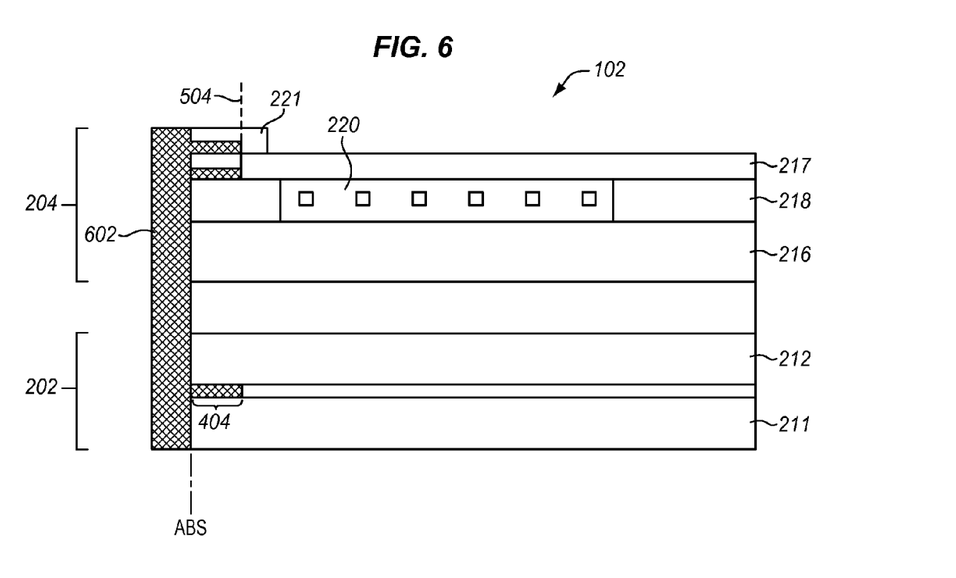
FIG. 6 is a cross-sectional view of a recording head after conductive material is deposited on an air bearing surface.

With the voids formed in recording heads 102, conductive material for a wrap around shield is deposited on ABS 402 of row 100. FIG. 6 is a cross-sectional view of recording head 102 after the conductive material 602 is deposited on the ABS. Conductive material 602 fills the void 502 in recording head 102, thus forming the wrap around shield. Because the selective etching process is used to define back edge 504, the back edge 504 of the wrap around shield is accurately defined.

In addition to filling void 502 in recording head 102, the conductive material 602 covers the entire ABS 402 of row 100. This conductive material 602 needs to be removed in a subsequent lapping process. One problem with the ABS damascene process is there is presently no effective way of determining when to stop the lapping process. If row 100 is lapped too long to remove the conductive material 602, then the strip height 404 of the MR sensors 213 in the recording heads 102 may be decreased beyond a desired level. At the same time, if row 100 is not lapped long enough, then the conductive material 602 will remain on ABS 402 of row 100.

Although FIGS. 1-6 illustrate an ABS damascene process that is used to form a wrap around shield, other features in recording heads may be formed with an ABS damascene process. The formation of such features similarly results in a conductive material 602 that is deposited on the ABS of a row, which needs to be removed. The following embodiments describe ways of effectively removing the conductive material 602.

FIGS. 7-12 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 7:
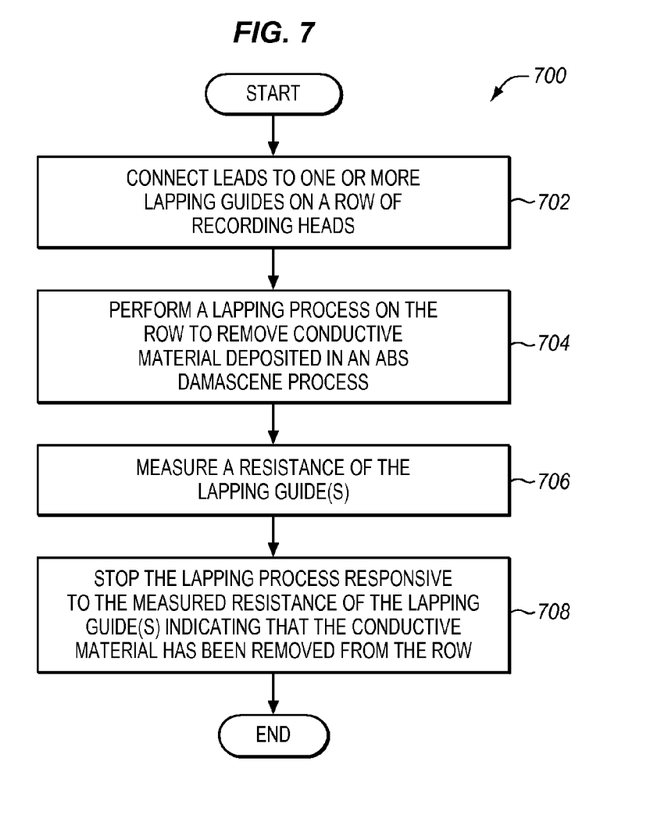
FIG. 7 is a flow chart illustrating a method of controlling a lapping process for lapping conductive material from a row of recording heads that was deposited during an ABS damascene process in an exemplary embodiment of the invention.

FIG. 7 is a flow chart illustrating a method 700 of controlling a lapping process for lapping conductive material from a row of recording heads that was deposited during an ABS damascene process in an exemplary embodiment of the invention. Method 700 is not all-inclusive, and may include other steps not shown for the sake of brevity. Assume for method 700 that row 100 is again registered in clamping system 306 of FIG. 3 with the conductive material (i.e., wrap around shield material) 602 facing toward lapping tool 304.

Figure 8:
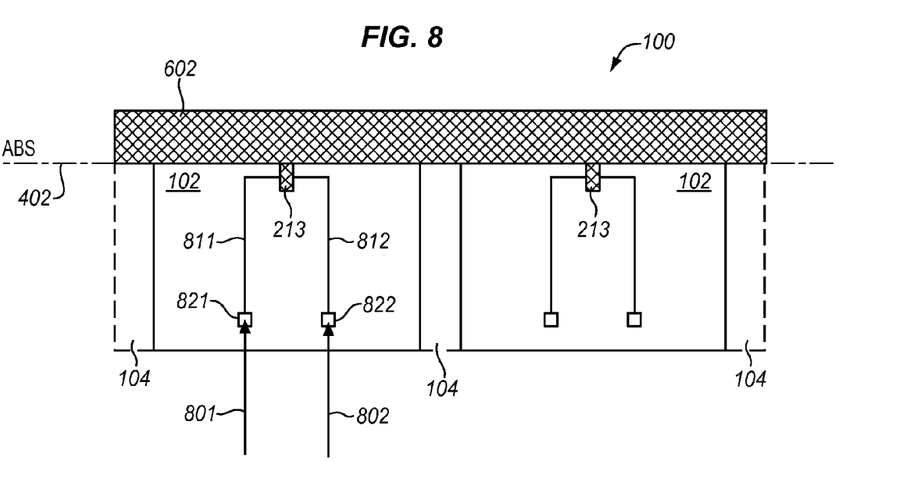
FIG. 8 illustrates leads connected to a lapping guide in an exemplary embodiment of the invention.

Step 702 of FIG. 7 comprises connecting leads to one or more lapping guides on row 100. FIG. 8 illustrates leads 801-802 connected to a lapping guide in an exemplary embodiment of the invention. Leads 801-802 may be connected from the lapping guide to lapping controller 302 (see FIG. 3) using a ribbon cable or another other desired cabling. In the embodiment of FIG. 8, the lapping guide comprises an MR sensor 213 in a recording head 102, but the lapping guide may comprise an ELG in other embodiments. MR sensor 213 is illustrated as having two traces 811-812 that connect to opposing sides of MR sensor 213, and also connect to pads 821-822. Leads 801-802 thus connect to pads 821-822 of recording head 102. Those skilled in the art will appreciate that additional leads may also be connected to the other read element 102 shown in FIG. 8, and multiple other read elements 102.

When conductive material 602 is deposited on ABS 402, the conductive material 602 creates a short across MR sensor 213 at ABS 402. Before conductive material 602 is deposited, MR sensor 213 has a certain resistance, such as 50 ohms. When conductive material 602 creates a short across MR sensor 213, the resistance of MR sensor 213 will decrease to a resistance indicating a short circuit (i.e., near zero ohms).

Step 704 of FIG. 7 comprises performing a lapping process on row 100 of recording heads 102. The lapping process for step 704 is to remove conductive material 602 that has been deposited on ABS 402 of row 100 (see FIG. 8). To perform the lapping process, lapping controller 302 in FIG. 3 transmits control signals to lapping tool 304. Responsive to the control signals, lapping tool 304 begins to lap the conductive material 602 from ABS 402.

Step 706 of FIG. 7 comprises measuring a resistance of the lapping guide(s) in row 100. This measuring step may be performed by lapping controller 302 receiving resistance values from the lapping guide(s) in row 100. As long as conductive material 602 is present on ABS 402, the conductive material 602 will create a short in the lapping guide(s). Consequently, the resistance measured for each lapping guide will be low (i.e., near zero). When conductive material 602 is removed from ABS 402 due to the lapping, the short created on the lapping guide will be removed.

Figure 9:
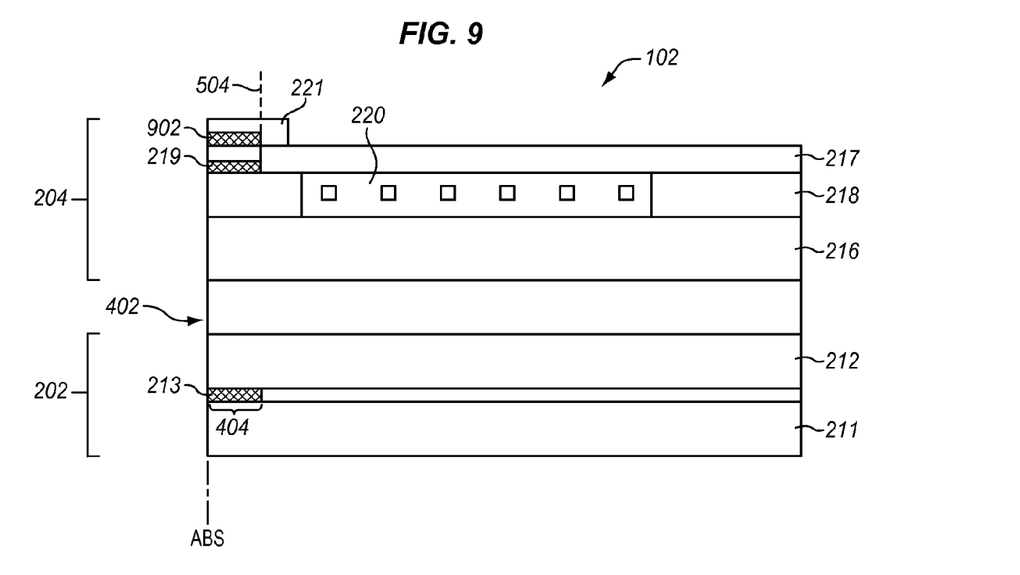
FIG. 9 is a cross-sectional view of a recording head with conductive material removed from an air bearing surface.

FIG. 9 is a cross-sectional view of recording head 102 with conductive material 602 removed from ABS 402. Assume again for FIG. 9 that MR sensor 213 comprises the lapping guide. With conductive material 602 removed, there is no longer a short on MR sensor 213 at ABS 402. Thus, the resistance measured on MR sensor 213 is the resistance of MR sensor 213 as defined by its stripe height 404.

Figure 10:
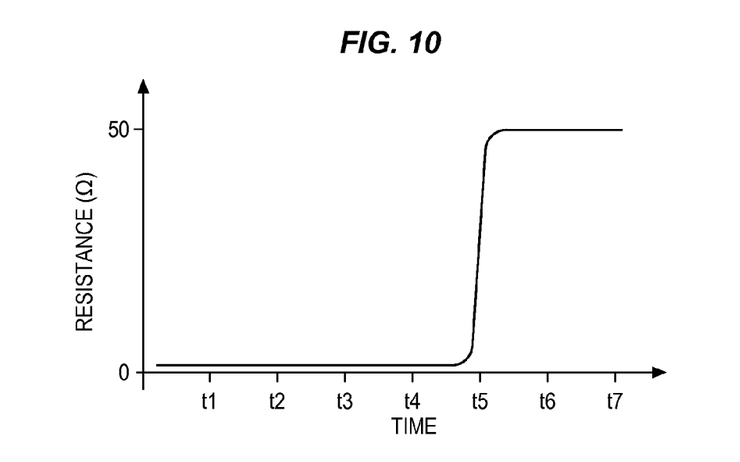
FIG. 10 is a graph illustrating the resistance response of a lapping guide in an exemplary embodiment of the invention.

When conductive material 602 is removed from ABS 402, the resistance of the lapping guide will spike from a very low resistance to another resistance that is much higher. FIG. 10 is a graph illustrating the resistance response of a lapping guide in an exemplary embodiment of the invention. When conductive material 602 is present on ABS 402 of row 100, the resistance of the lapping guide is near 0 ohms. When the lapping process removes the conductive material 602 from ABS 402, the resistance of the lapping guide will spike (at time t5) from near 0 ohms to about 50 ohms. This spike in resistance indicates that conductive material 602 has been removed (at least from this lapping guide).

Step 708 of FIG. 7 comprises stopping the lapping process responsive to the resistance of the lapping guide(s) indicating that the conductive material 602 has been removed from ABS 402 of row 100. The lapping process may be stopped by lapping controller 302 transmitting the appropriate control signals to lapping tool 304. The process described in FIG. 7 allows for an accurate determination of when conductive material 602 has been removed from ABS 402 of row 100 so that row 100 is not lapped too long. This prevents the stripe height 404 of the MR sensors 213 in recording heads 102 from being decreased beyond a desired height by the lapping process.

Lapping controller 302 may be connected to multiple lapping guides that are spaced along row 100 to ensure that conductive material 602 has been removed from each portion of row 100. The lapping process may remove more conductive material 602 from certain regions of row 100 while not removing as much in other regions. Thus, by connecting to multiple lapping guides that are spaced out along row 100, multiple regions of row 100 may be monitored to ensure that conductive material 602 has been removed. For example, lapping controller 302 may connect to as many as twenty lapping guides spaced out along row 100 to ensure that all of conductive material 602 has been removed.

In addition to determining when conductive material 602 is removed from ABS 402, the lapping guides may be used to provide servo data to lapping controller 302 so that the conductive material 602 may be lapped more evenly from row 100. A method of using the lapping guides to evenly lap conductive material 602 is provided in FIG. 11.

Figure 11:
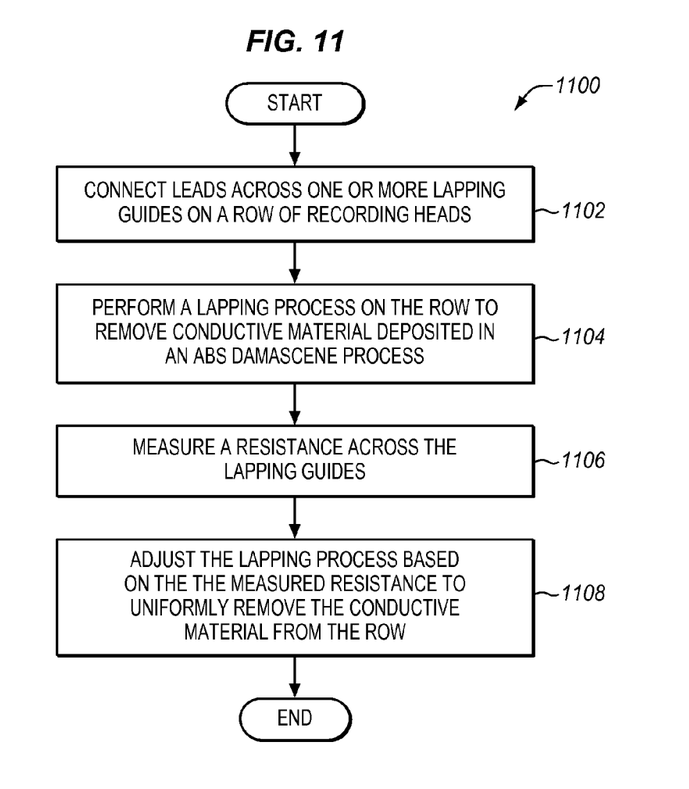
FIG. 11 is a flow chart illustrating another method of controlling a lapping process for lapping conductive material from a row of recording heads that was deposited during an ABS damascene process in an exemplary embodiment of the invention.

FIG. 11 is a flow chart illustrating another method 1100 of controlling a lapping process for lapping conductive material from a row of recording heads that was deposited during an ABS damascene process in an exemplary embodiment of the invention. Method 1100 is not all-inclusive, and may include other steps not shown for the sake of brevity. As with method 700, row 100 is again registered in clamping system 306 of FIG. 3 with the conductive material 602 facing toward lapping tool 304.

Step 1102 comprises connecting leads across one or more lapping guides on row 100. By connecting leads "across" a single lapping guide, a series circuit is created to measure the sheet resistance of the conductive material 602 across the lapping guide. By connecting leads across two lapping guides, a series circuit is created between the two lapping guides and the conductive material 602 that connects the lapping guides at ABS 402.

Figure 12:
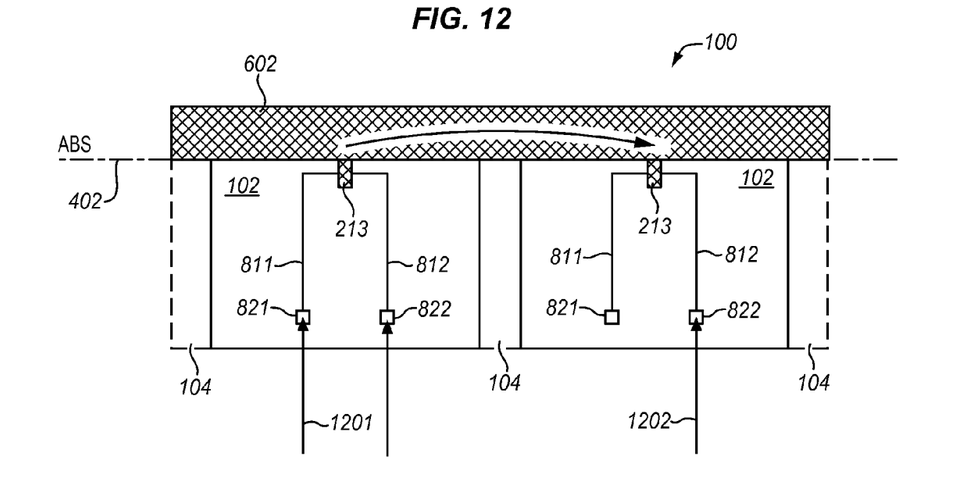
FIG. 12 illustrates leads connected across two lapping guides in an exemplary embodiment of the invention.

FIG. 12 illustrates leads connected across two lapping guides in row 100 in an exemplary embodiment of the invention. Although the leads in FIG. 12 are connected across two lapping guides, the leads may be connected across a single lapping guide. In the embodiment of FIG. 12, the lapping guides comprises MR sensors 213 in recording heads 102, but the lapping guides may comprise ELGs or a combination of ELGs and MR sensors in other embodiments. As in FIG. 8, MR sensor 213 is illustrated as having two traces 811-812 that connect to opposing sides of MR sensor 213, and also connect to pads 821-822. One lead 1201 connects to pad 821 of MR sensor 213 in the left recording head 102 in FIG. 12, and another lead 1202 connects to pad 822 of MR sensor 213 in the right recording head in FIG. 12. These connections create a series circuit so that a current may be passed through MR sensor 213 in the left recording head 102, through conductive material 602 between the MR sensor 213 in the left recording head 102 and the MR sensor 213 in the right recording head 102, and then through the MR sensor 213 in the right recording head 102. Although the left recording head 102 and the right recording head 102 are illustrated as being consecutively aligned in row 100, they may separated from one another by one or more other recording heads 102.

Step 1104 of FIG. 11 comprises performing the lapping process on row 100 of recording heads 102. The lapping process for step 1104 is again to remove conductive material 602 that has been deposited on ABS 402 of row 100.

Step 1106 of FIG. 11 comprises measuring a resistance across the lapping guide(s) in row 100. This measuring step may be performed by lapping controller 302 receiving resistance values from the lapping guide(s) in row 100. The resistance of conductive material 602 is defined by its sheet resistance, which is a function of resistivity divided by the thickness of the material (ohms/square). Thus, as conductive material 602 is removed by the lapping process, the resistance of conductive material 602 will increase.

Step 1108 comprises adjusting the lapping process based on the measured resistance to uniformly remove conductive material 602 from ABS 402 of row 100. Lapping controller 302 (see FIG. 3) may use the measured resistance as servo data to control lapping tool 304. The process described in FIG. 11 allows lapping controller 302 to uniformly lap the conductive material 602 from ABS 402 of row 100.

Lapping controller 302 may be connected across multiple sets of (two) lapping guides that are spaced along row 100. Each set of lapping guides corresponds with a region of row 100. As conductive material 602 is lapped away, the resistance of wrap around shield material 602 will increase in each of the regions of row 100. However, if lapping tool 304 is lapping conductive material 602 unevenly, then the resistance values in one or more of the regions will be different. Thus, lapping controller 302 may adjust the lapping process in each region based on the resistances measured for each set of lapping guides. Lapping controller 302 may thus adjust the control signals being sent to lapping tool 304 so that the regions are lapped at the same rate.

If each region of row 100 is uniformly lapped, then conductive material 602 will be removed from ABS 402 at substantially the same rate, and the lapping process may be stopped as provided in method 700 (see FIG. 7). If each region of row 100 is not uniformly lapped, then the lapping process will be removing conductive material 602 in some regions, but may be further lapping the ABS 402 in other regions, which decreases the stripe height 404 of the MR sensors 213 in the recording heads 102 in those regions. Thus, uniform lapping protects against "over lapping" of some of the recording heads 102.

Although specific embodiments were described herein, the scope of the invention is not limited to those specific embodiments. The scope of the invention is defined by the following claims and any equivalents thereof.

We claim:

1. A method of controlling a lapping process for lapping conductive material from a row of recording heads, wherein the conductive material was deposited on an air bearing surface (ABS) of the row of recording heads during an ABS damascene process used to form a feature in the recording heads, the method comprising:
    connecting electrical leads to at least one lapping guide on the row of recording heads, wherein the conductive material deposited during the ABS damascene process creates a short circuit across the at least one lapping guide;
    performing a lapping process on the row of recording heads to remove the conductive material from the ABS of the row deposited during the ABS damascene process;
    measuring a resistance of the at least one lapping guide in the row of recording heads; and
    stopping the lapping process responsive to a measured resistance of the at least one lapping guide indicating that the conductive material deposited during the ABS damascene process has been removed from the ABS of the row of recording heads.

2. The method of claim 1 wherein measuring the resistance of at least one lapping guide comprises:
    measuring the resistance of the at least one lapping guide to identify a change from a first resistance indicating a short circuit to a second resistance that is higher than a short circuit.

3. The method of claim 1 wherein connecting electrical leads to at least one lapping guide on the row of recording heads comprises:
    connecting electrical leads to a plurality of lapping guides that are spaced along the row of recording heads.

4. The method of claim 1 wherein the at least one lapping guide comprises a magnetoresistance (MR) sensor formed in at least one of the recording heads.

5. The method of claim 1 wherein the at least one lapping guide comprises at least one electrical lapping guide (ELG) formed in the row of recording heads.

6. The method of claim 1 further comprising:
    connecting a first electrical lead and a second electrical lead to a lapping guide on the row of recording heads;
    measuring a resistance across the lapping guide; and
    adjusting the lapping process based on the measure resistance to uniformly remove the conductive material from the ABS of the row of recording heads.

7. The method of claim 1 further comprising:
    connecting a first electrical lead to a first lapping guide and a second electrical lead to a second lapping guide on the row of recording heads;
    measuring a resistance across the first lapping guide and the second lapping guide; and
    adjusting the lapping process based on the measure resistance to uniformly remove the conductive material from the ABS of the row of recording heads.

8. A method of controlling a lapping process for lapping conductive material from a row of recording heads, wherein the conductive material was deposited on an air bearing surface (ABS) of the row of recording heads during an ABS damascene process used to form features in the recording heads, the method comprising:
    connecting a first electrical lead and a second electrical lead across at least one lapping guide on the row of recording heads, wherein the conductive material deposited during the ABS damascene process creates a short circuit across the at least one lapping guide;

performing a lapping process on the row of recording heads to remove the conductive material from the ABS of the row deposited during the ABS damascene process;

measuring a resistance across the at least one lapping guide; and adjusting the lapping process based on the measured resistance to uniformly remove the conductive material from the ABS of the row of recording heads deposited during the ABS damascene process.

9. The method of claim 8 wherein connecting a first electrical lead and a second electrical lead across at least one lapping guide on the row of recording heads comprises:

connecting electrical leads across multiple sets of lapping guides that are spaced along the row of recording heads, wherein each set of lapping guides corresponds with a region of the row of recording heads.

10. The method of claim 9 wherein adjusting the lapping process based on the measured resistance comprises:

adjusting the lapping process in each region of the row of recording heads based on the resistance measured for each set of lapping guides so that each regions is lapped substantially uniform.

11. The method of claim 8 wherein the at least two lapping guides comprise magnetoresistance (MR) sensors formed in at least two recording heads.

12. The method of claim 8 wherein the at least two lapping guides comprise at least two electrical lapping guides (ELG) formed in the row of recording heads.

13. The method of claim 8 further comprising:

stopping the lapping process responsive to a measured resistance of the at least one lapping guide indicating that the conductive material has been removed from the ABS of the row of recording heads.

* * * * *

UNITED STATES PATENT AND TRADEMARK OFFICE
CERTIFICATE OF CORRECTION

| | | |
|---|---|---|
| PATENT NO. | : 8,082,658 B2 | Page 1 of 1 |
| APPLICATION NO. | : 12/036478 | |
| DATED | : December 27, 2011 | |
| INVENTOR(S) | : Boone, Jr. et al. | |

It is certified that error appears in the above-identified patent and that said Letters Patent is hereby corrected as shown below:

IN THE SPECIFICATIONS:

In column 1 line 17, the text "An actuator/suspension and holds" should read --An actuator/suspension arm holds--

In column 2 line 55, the text "the back edge may be define defined" should read --the back edge may be defined--

Signed and Sealed this
Fourteenth Day of February, 2012

David J. Kappos
*Director of the United States Patent and Trademark Office*